(12) United States Patent
Norin

(10) Patent No.: US 9,743,383 B1
(45) Date of Patent: Aug. 22, 2017

(54) HYBRID WIRELESS-WIRELINE COMMUNICATIONS SYSTEM AND METHOD

(71) Applicant: The DIRECTV Group, Inc., El Segundo, CA (US)

(72) Inventor: John L. Norin, Weston, FL (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 150 days.

(21) Appl. No.: 14/630,582

(22) Filed: Feb. 24, 2015

(51) Int. Cl.
*H04L 1/00* (2006.01)
*H04W 72/00* (2009.01)
*H04B 3/03* (2006.01)
*H04B 3/44* (2006.01)

(52) U.S. Cl.
CPC ............ *H04W 72/005* (2013.01); *H04B 3/03* (2013.01); *H04B 3/44* (2013.01)

(58) Field of Classification Search
CPC .......... H04W 72/005; H04B 3/44; H04B 3/03
See application file for complete search history.

(56) References Cited

U.S. PATENT DOCUMENTS

| | | | |
|---|---|---|---|
| 9,059,776 B1* | 6/2015 | Jimenez de Parga | ... H04B 3/30 |
| 2004/0077310 A1* | 4/2004 | Levy | ..... H04L 12/2838 455/7 |
| 2004/0187156 A1* | 9/2004 | Palm | .... H04L 12/2803 725/81 |
| 2005/0235333 A1* | 10/2005 | Bertonis | ..... H04L 12/2801 725/111 |
| 2008/0198827 A1* | 8/2008 | Radpour | ..... H04B 3/44 370/339 |
| 2010/0157817 A1* | 6/2010 | Mergler | ...... H04W 36/30 370/252 |
| 2010/0290388 A1* | 11/2010 | Srivastava | ...... H04N 21/4104 370/328 |
| 2011/0292989 A1* | 12/2011 | Nguyen | ...... H04L 25/03006 375/229 |
| 2013/0181872 A1* | 7/2013 | Furukawa | ..... H01P 11/002 343/702 |
| 2014/0254351 A1* | 9/2014 | Newman | ..... H04L 41/0659 370/228 |

\* cited by examiner

*Primary Examiner* — Clemence Han
(74) *Attorney, Agent, or Firm* — Gates & Cooper LLP

(57) ABSTRACT

A device and method for communicating information using a plurality of communication paths is disclosed. In one embodiment, the device transmits provides information between a port of a wireless transceiver to a coaxial power connector coupled to a coaxial cable network, thereby providing a wired communication path from one network device to another network device to augment or replace the wireless communication path between the same devices.

22 Claims, 12 Drawing Sheets

HYBRID WIRELESS-WIRELINE COMMUNICATIONS SYSTEM AND METHOD

BACKGROUND OF THE INVENTION

1. Field of the Invention

The present invention relates to systems and methods for communicating data, and in particular to a system and method for redundant communications of data along a plurality of communication paths.

2. Description of the Related Art

In recent years, home entertainment systems have been networked in order to provide media content to a wide variety of devices around the home. For example, a satellite television receiver, sometimes known as an Integrated Receiver Decoder (IRD) or Set Top Box (STB) may provide media programs and information received from the headend via the satellite to other devices in the home such as smartphones, computers, digital video recorders (DVRs), or other displays. Further, home networking systems may accept data from other sources (e.g. security cameras, door sensors, burglar alarms and the like) and using the network connectivity often utilized by IRDs, provide data from those sources to entities external to the home.

Preferably, the bandwidth of such networking systems is high, so as to permit the reproduction of high definition (HD) program materials, and of minimal latency, so that each of the home devices receives the media program at essentially the same time. Because intermittent interruption of such media programs is a major annoyance, it is also desirable that the data together comprising the media program(s) be delivered to the devices with high reliability.

In order to provide optimal operator class networking in the home for content such as television, security video, audio, consumer Internet data, it is necessary to provide a robust, reliable connection at a price point that can be justified in the business case for each application. Including multiple networking technologies in a home networking system requires multiple devices or at least multiple chipsets in devices in the network, is typically too cost prohibitive.

What is needed is a system and method that allows for single commonplace networking chipset, yet provides robust reception and transmission (transception) of data at low-latencies and high-bandwidth. The present invention satisfies that need.

SUMMARY OF THE INVENTION

To address the requirements described above, the present invention discloses a device and method for communicating information using a plurality of communication paths. In one embodiment, the device comprises a first device RF compatible coaxial port, for accepting a power signal powering the first device from a second device and a first device wireless transceiver, powered by the power signal. The first device wireless transceiver comprises a first device first port providing a first device first radio-frequency modulated output signal comprising at least a portion of the information, the first device first port communicatively coupled to a first device antenna to wirelessly transmit the a least a first portion of the information via a first of the plurality of communication paths; and a first device second port providing a first device second radio frequency modulated output signal comprising at least a second portion of the information, the first device second port communicatively coupled to the RF compatible coaxial port to transmit the at least a second portion of the information via a second of the plurality of communication paths.

In another embodiment, the method for communicating information using a plurality of communication paths is evidenced by a method comprising accepting a power signal powering a first device in a first device RF compatible coaxial port; providing a first device first radio-frequency modulated output signal comprising at least a portion of the information to a first device first port communicatively coupled to a first device antenna to wirelessly transmit the at least a first portion of the information via a first of the plurality of communication paths; providing a first device second radio frequency modulated output signal comprising at least a second portion of the information via a first device second port communicatively coupled to the RF compatible coaxial port to transmit the at least a second portion of the information via a second of the plurality of communication paths.

The disclosed system and method provides robust transception of data at low-latencies and high-bandwidth using a single networking chipset, typically implemented in a wireless radio or transceiver with multiple antenna inputs. Thus, a single device can be configured, reconfigured, or adaptively configured to provide data by wired, wireless or a combination of wired and wireless means. Further data may be provided by wired and wireless means on a concurrent or serial basis. This allows different networking options to be assembled without the need for multiple special purpose devices.

Unlike existing modem solutions which are designed as either wireless or wired in nature, this provides a single Wi-Fi networking technology modem solution that can be used simultaneously over a wireless and one or more wired connections.

The disclosed system and method also takes advantage of the inherent flexibility and robustness of multiple-input multiple-output (MIMO) wireless radios over single input, single output wireless radios and wired systems, and the ability to transceive data using beamforming and beam isolation techniques.

In the description that follows, wired transmission may comprise transmission via coax cable, a copper twisted pair phone line, or the power mains, consistent with regulatory constraints. Further, the modem may use more than one of these on a common or separate antenna interface from said wireless radio. Further, a mesh networking implementation may be included in each network device, thus permitting the most robust path is selected between any source and sink of data.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention. In the following description, the terms "transception" and "transceive" are used to refer to either transmission, reception or the process of transmitting and receiving data and other information.

Distribution System

Figure 1:
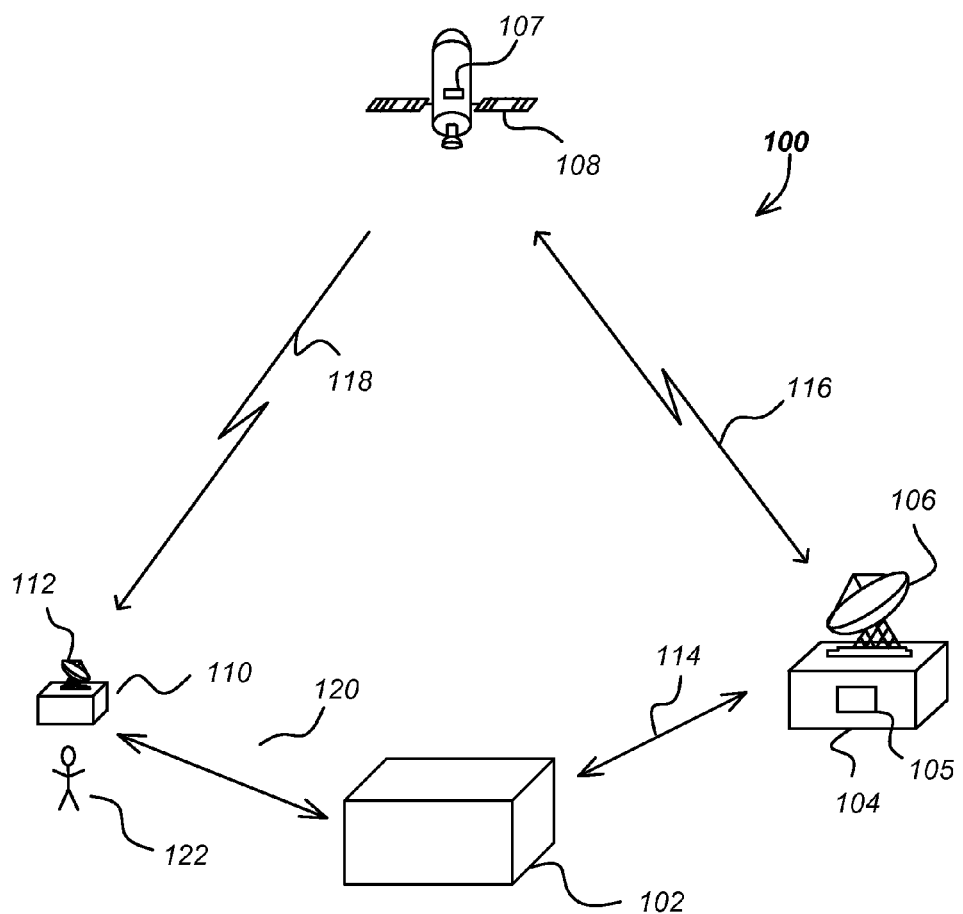
FIG. 1 is a diagram illustrating an overview of a distribution system that can be used to provide video data, software updates, and other data to subscribers.

FIG. 1 is a diagram illustrating an overview of a distribution system 100 that can be used to provide video data, software updates, and other data to subscribers. The distribution system 100 comprises a control center 102 or head-end in communication with an uplink center 104 via a ground or other link 114 and with a subscriber receiver station 110 via a communication link 120 independent of the downlink 118 such as public switched telephone network (PSTN), Internet, or other link. The control center 102 provides program material (e.g. video programs, audio programs, software updates, and other data) to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using one or transponders 107 or transmitters. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite based distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well. It is also used to deliver current receiver software and announcement schedules for the receiver to rendezvous to the appropriate downlink 118. Link 120 may be used to report the receiver's current software version.

Uplink Configuration

Figure 2:
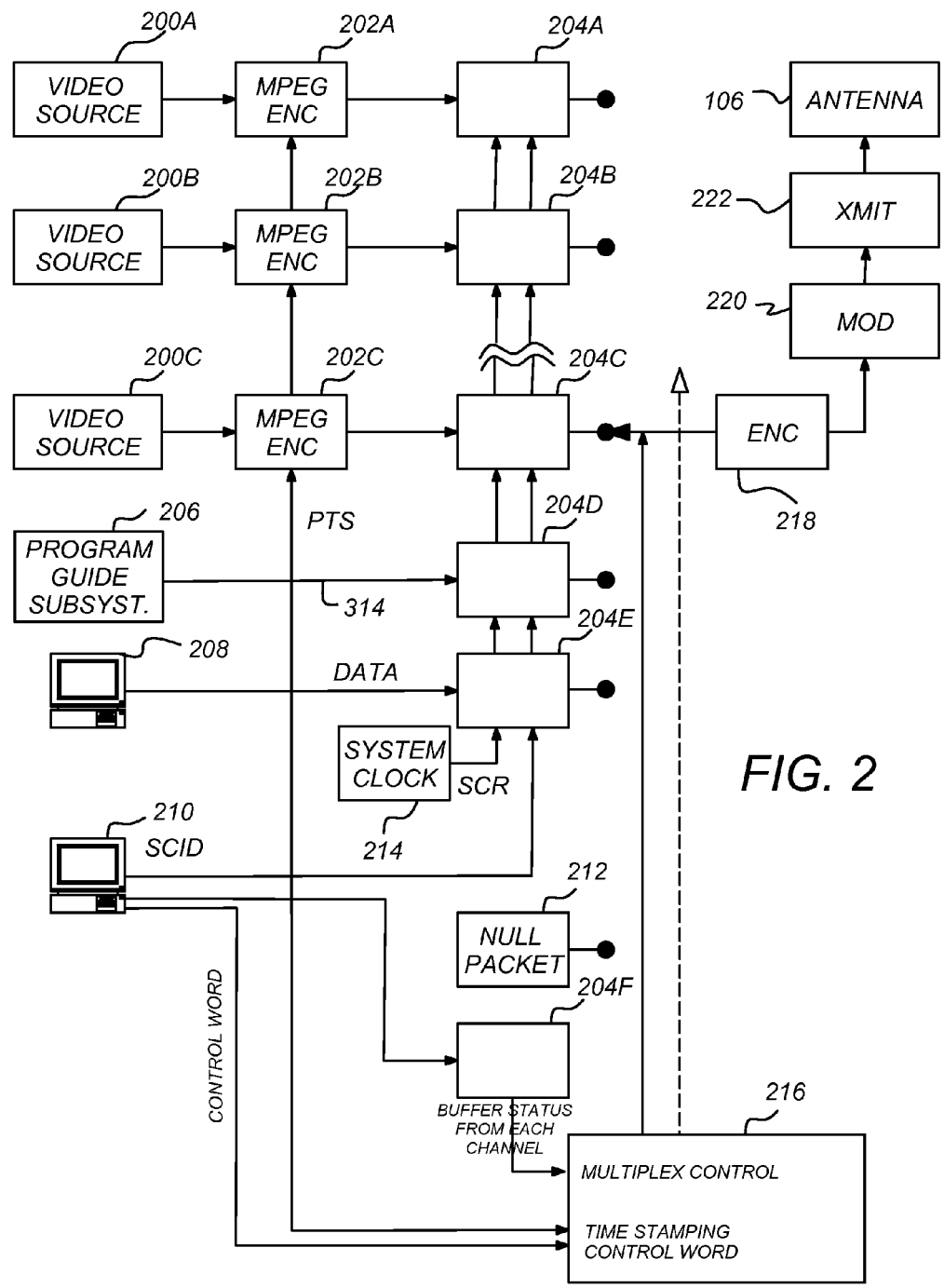
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206 and data such as software updates from a data source 208.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 (SCR), and from the conditional access manager 210, which provides the SCID to the packetizers 204 for use in generating the data packets. These data packets are then multiplexed into serial data and transmitted.

Broadcast Data Stream Format and Protocol

Figure 3A:
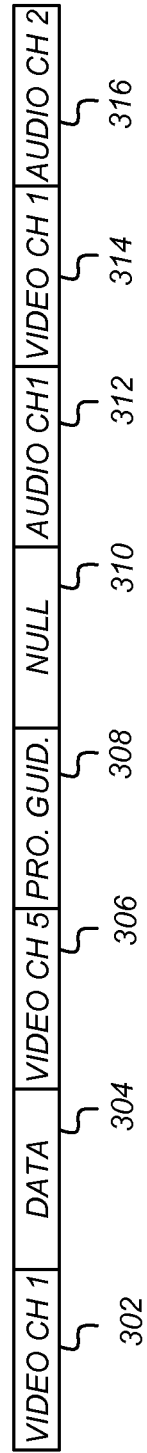
FIG. 3A is a diagram of a representative data stream.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 200 receives these signals, and using the SCID, reassembles the packets to regenerate the program material for each of the channels.

Figure 3B:
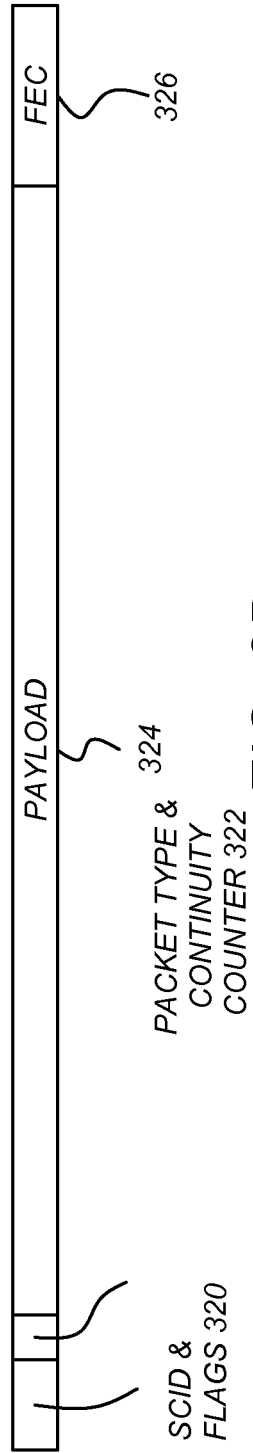
FIG. 3B is a diagram of an exemplary data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 3 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 300 or other audio or data sources. The final packet segment 326 is data required to perform forward error correction.

Home Network

Figure 4:
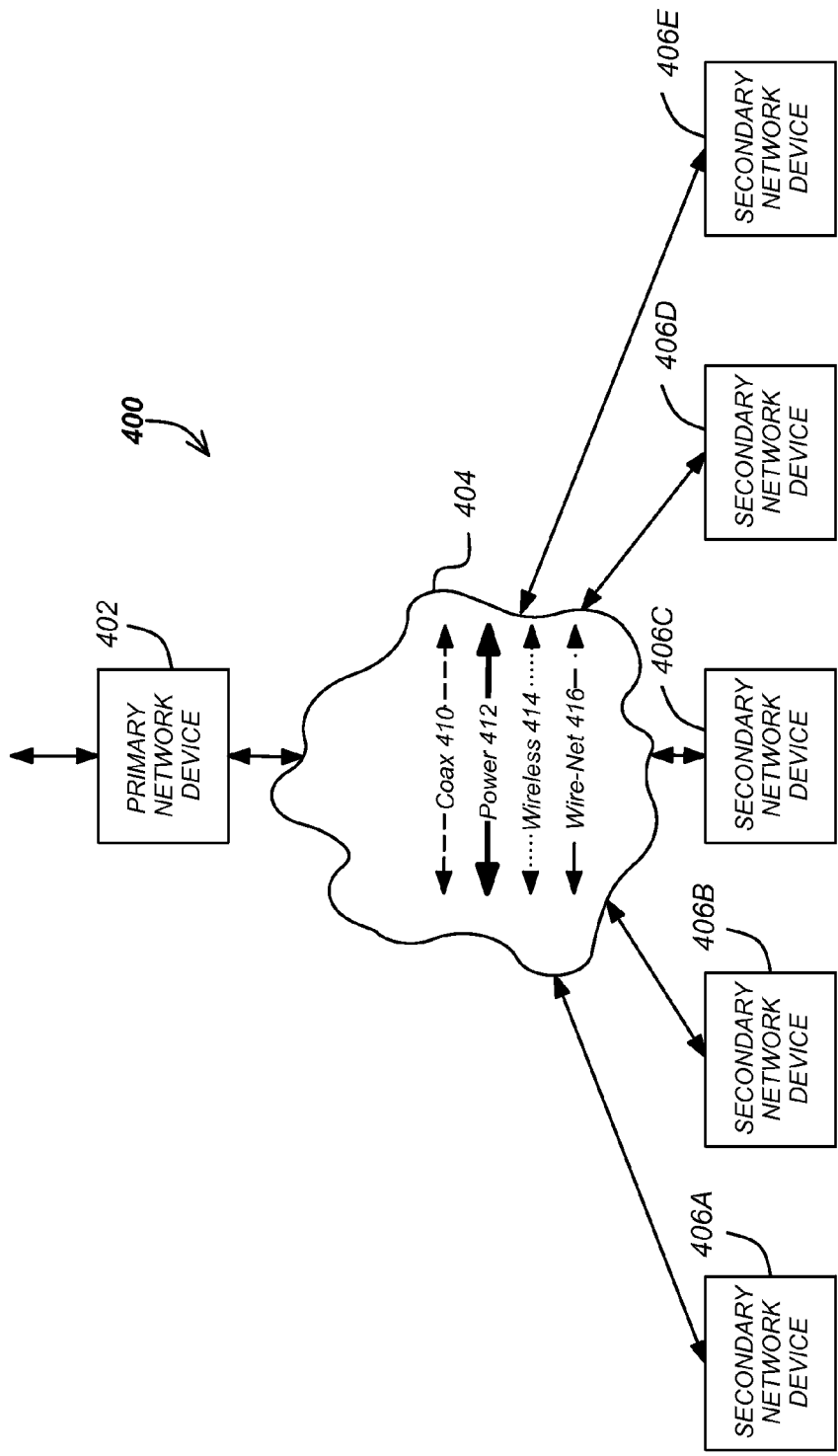
FIG. 4 is a diagram illustrating an exemplary home network.

FIG. 4 is a diagram illustrating an exemplary home network 400. The home network 400 comprises a primary network device 402 that is communicatively coupled to one or more secondary network devices 406A-406E (hereinafter alternatively referred to as secondary network device(s) 406).

In one embodiment, the primary network device 402 operates as a gateway device, linking secondary network devices 406A-406E with external entities. For example, the primary network device 402 may be a STB (described further below) disposed at the subscriber station 110, and provide for communication between the secondary network devices 406A-406E and the elements of the distribution system 100 illustrated in FIG. 1.

The primary network device 402 may operate as a relay device, accepting data or commands from one of the secondary network devices 406 via the transmission network 404 and providing the data or commands to another of the secondary network devices 406 via the transmission network 404. Such data or commands can include data or commands associated with navigation of the Internet. When so operated, the primary network device 402 operates as a relay network device.

The primary network device 402 may also provide data or commands originating in the primary network device 402 to any or all of the secondary network devices 406 via the transmission network 404.

Secondary network devices 406 may also transmit or receive commands from one or more of the other of the secondary network devices via the transmission network 404, without the primary network device 402.

The transmission network includes one or more of a coax cable network 410, a Powerline network 412, a wireless (e.g. WiFi) network 414 and a wired network 416 (typically using conductive wire in a configuration unsuitable for RF transmission, such as a twisted pair), each implementing one or more communications links among the network devices 402, 406. For purposes of description, the wired network 416 will be referred to as an Ethernet network. As described further below, data and or commands can be provided using more than one of the communications links provided by the transmission network 404.

In one embodiment, the primary network device comprises a set top box (STB) (alternatively referred to hereinafter as an integrated receiver/decoder or IRD) located at the subscriber receiving station 110, as further described below. Further, secondary network devices 406 may include another STB, a light STB that receives data from the primary STB and provides it for display (further described below), or other device.

Set Top Box

Figure 5:
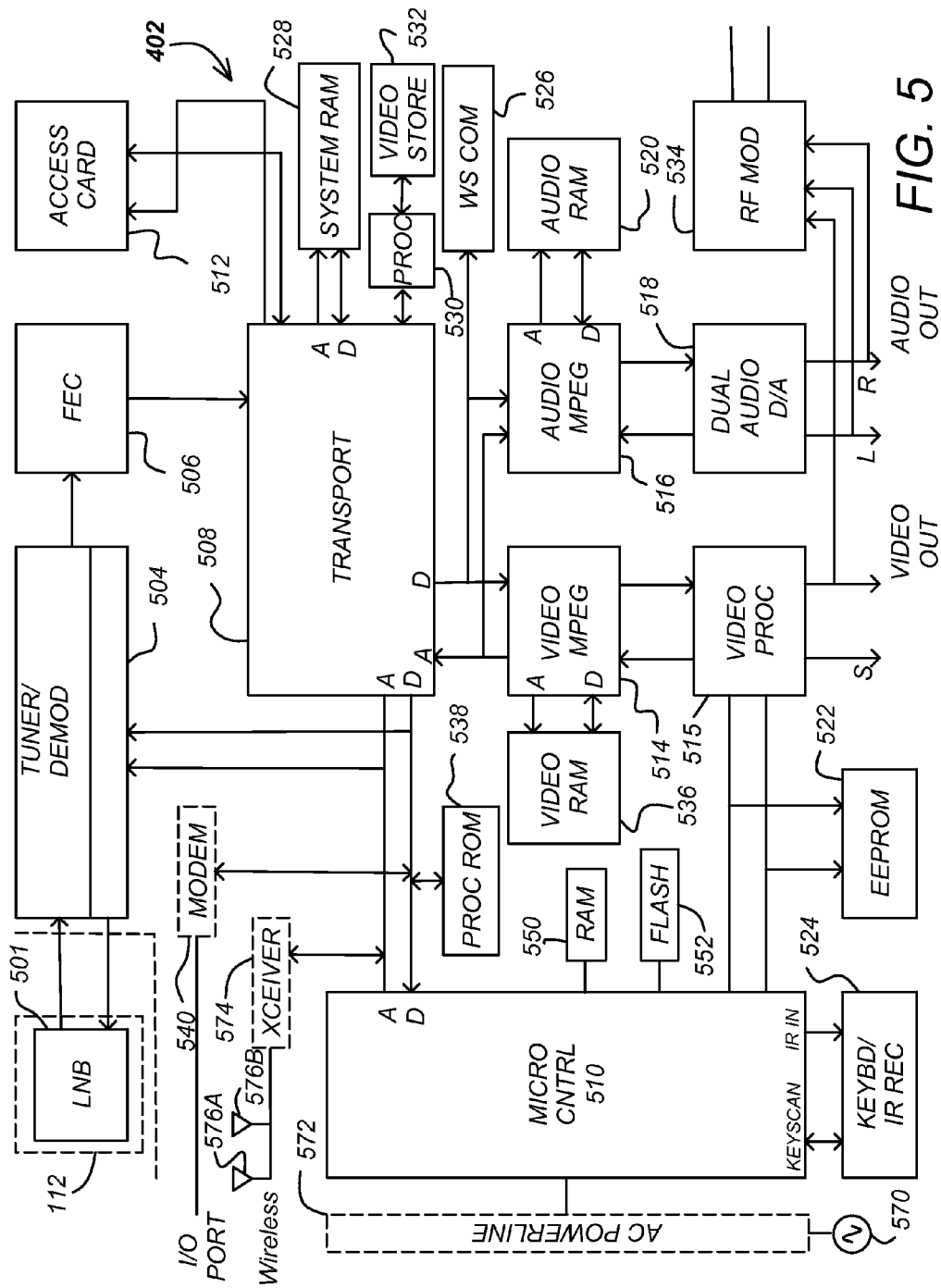
FIG. 5 is a block diagram of an exemplary set top box.

FIG. 5 is a block diagram of an exemplary STB 402. The STB 402 comprises a tuner/demodulator 504 for receiving signals comprising media programs from the headend 102 illustrated in FIG. 1. In the illustrated embodiment, the STB 402 receives signals transmitted via satellite by use of a low noise block converter (LNB) 501 disposed on an outdoor unit 112 in conjunction with a satellite receive antenna. However, the STB 402 may be configured to receive signals transmitted via cable network, and hence, not require the LNB 501 or the ODU. Further, the STB may receive signals via the Internet or other source, thus further obviating the need for the tuner/demodulator 504 as well. However, for illustrative purposes, the discussion of the STB 402 below presumes that the STB 402 comprises a satellite receiver.

Referring to FIG. 5, the exemplary STB 402 is communicatively coupled to an ODU 112 having one or more LNBs 501. Each LNB 502 converts the 12.2- to 12.7 GHz downlink 118 signal from the satellites 108 to an appropriate (e.g., 950-1450 MHz) signal required by the set top box's tuner/demodulator 504. The LNB 501 may provide either a dual or a single output. The single-output LNB 501 has only one RF connector, while the dual output LNB 501 has two RF output connectors and can be used to feed a second tuner, a second STB 402 or some other form of distribution system. In one embodiment, the RF connectors are coaxial connectors such as those compatible with RF port 704, 814, and 908 as discussed below.

The tuner/demodulator 504 isolates a single, digitally modulated 24 MHz transponder signal, and converts the modulated data to a digital data stream. As packets are received, the tuner/demodulator 504 identifies the type of each packet. If tuner/demodulator 504 identifies a packet as program guide data, tuner/demodulator 504 outputs the packet to memory 538. The digital data stream is then supplied to a forward error correction (FEC) decoder 506. This allows the set top box 402 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 506 to the transport module 508 via an 8-bit parallel interface.

The transport module 508 performs many of the data processing functions performed by the set top box 402. The transport module 508 processes data received from the FEC decoder module 506 and provides the processed data to the video MPEG decoder 514, the audio MPEG decoder 516, and the microcontroller 510 and/or data storage processor 530 for further data manipulation. In one embodiment of the present invention, the transport module 508, video MPEG decoder 514 and audio MPEG decoder 516 are all implemented on a single integrated circuit. This design promotes both space and power efficiency, and increases the security of the functions performed within the transport module 508. The transport module 508 also provides a passage for communications between the microprocessor 510 and the video and audio MPEG decoders 514, 516. As set forth more fully hereinafter, the transport module also works with the conditional access module (CAM) 512 to determine whether the subscriber receiving station 110 is permitted to access certain program material and deliver the program material only if authorized. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the set top box 402 to pass information. In order to implement the processing performed in the CAM 512, the set top box 402, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 515, which converts the digital video information received from the video MPEG module 514 into an output signal usable by a display or other output device. By way of example, processor 515 may comprise a National TV Standards Committee (NTSC) or Advanced Television Systems Committee (ATSC) encoder. In one embodiment of the invention, S-Video, baseband video and RF modulated video (NTSC or ATSC) signals are provided. Other outputs may also be utilized, and are advantageous if ATSC high definition programming is processed.

Audio data is likewise decoded by the MPEG audio decoder 516. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 510 receives and processes command signals from the remote control 524, a set top box 402 keyboard interface, modem 540, and transport 508. The microcontroller receives commands for performing its operations from a processor programming memory, which permanently stores such instructions for performing such commands. The memory used to store data for microprocessor 510 and/or transport 508 operations may comprise a read only memory (ROM) 538, an electrically erasable programmable read only memory (EEPROM) 522, a flash memory 552 and/or a random access memory 550, and/or similar memory devices. The microprocessor 510 also controls the other digital devices of the set top box 402 via address and data lines (denoted "A" and "D" respectively, in FIG. 5).

Modem 540 is communicatively coupled to the processor 510 and an I/O port to provide data communications between the STB 402 and other entities, including the headend 102 and the network devices 406A-406B. In one embodiment, the modem 540 comprises a telephone modem, and the I/O port is a telephone port such as a RJ-11 port that provides the STB 402 access to the public switched telephone network (PSTN). In another embodiment, the modem 540 is an optical modem such as those that are used with fiber-optic networks. In still another embodiment, the modem 540 is a cable, digital subscriber line (DSL) or Ethernet modem. The modem 540 may also perform any combination of the foregoing functionality (e.g. providing communications with the headend and network devices via the PSTN, Ethernet, fiber optic, and DSL). The modem 540 may be used to transmit the customer's purchase information for billing purposes, and/or other information to the headend, to receive data from the headend, and to transmit and/or receive (transceive) data with other devices in the network 400. The modem 540 may be controlled by the microprocessor 510, and can input and output data to other I/O port types including standard parallel and serial computer I/O ports.

The STB 402 may also comprise one or more wireless transceivers 574 communicatively coupled to wireless antennas 576A and 576B and the processor 510, for wirelessly transceiving data to and from the processor 510 or other elements of the STB 402 and other network devices 406A-406B. The STB 402 is typically powered by a 120 volt alternating current (AC) source 570. Typically, the STB 402 includes a power supply (not illustrated) that converts the 120 VAC power source to the appropriate DC voltage needed by each of the modules illustrated in FIG. 5. In addition to power, signals may also be communicated via the same conductors used to obtain the 120 VAC power. Such communication systems are known as "Powerline" communication systems, and permit communication throughout the home via the 120 VAC lines within the home, office, or other installation. To support this functionality, the STB 402 may include a powerline module 572 communicatively coupled to the power source 570 and the processor 510.

The set top box 402 may also comprise a local storage unit such as the storage device 532 for storing video and/or audio and/or other data obtained from the transport module 508. Video storage device 532 can be a hard disk drive, a read/writeable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video, audio, and/or other data from the storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microprocessor 510 can also perform the operations required to store and or retrieve video and other data in the video storage device 532.

The video processing module 515 output can be directly supplied as a video output to a viewing device such as a video or computer monitor. In addition, the video and/or audio outputs can be supplied to a RF modulator 534 to produce a RF output and/or 8 vestigial side band (VSB) suitable as an input signal to a conventional television tuner. This allows the set top box 402 to operate with televisions without a video input.

Each of the satellites 108 comprises one or more transponder, each of which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the set top box 402 also receives and stores a program guide in a memory available to the microprocessor 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite networks, satellite transponders and service channel identifications (SCIDs), and also provide TV program listing information to the subscriber 122 identifying program events.

Initially, as data enters the set top box 402, the tuner/demodulator 504 looks for a boot object. Boot objects are always transmitted with the same SCID number, so tuner 504 knows that it must look for packets marked with that identification number. A boot object identifies the identification numbers where all other objects can be found.

As data is received and stored in the memory, the microprocessor 510 acts as a control device and performs various operations on the data in preparation for processing the received data. These operations include packet assembly, object assembly and object processing.

The first operation performed on data objects stored in the memory 550 is packet assembly. During the packet assembly operation, microprocessor 510 examines the stored data and determines the locations of the packet boundaries.

The next step performed by microprocessor 510 is object assembly. During the object assembly step, microprocessor 510 combines packets to create object frames, and then combines the object frames to create objects. Microprocessor 510 examines the checksum transmitted within each object frame, and verifies whether the frame data was accurately received. If the object frame was not accurately received, it is discarded from memory 550. Also during the object assembly step, the microprocessor 510 discards assembled objects that are of an object type that the microprocessor 510 does not recognize. The set top box 402 maintains a list of known object types in memory 550. The microprocessor 510 examines the object header of each received object to determine the object type, and the microprocessor 510 compares the object type of each received object to the list of known object types stored in memory 550. If the object type of an object is not found in the list of known object types, the object is discarded from memory 550. Similarly, the set top box 402 maintains a list of known descriptor types in memory 550, and discards any received descriptors that are of a type not in the list of known descriptor types.

The last step performed by microprocessor 510 on received object data is object processing. During object processing, the objects stored in the memory 550 are combined to create a digital image. Instructions within the objects direct microprocessor 510 to incorporate other objects or create accessible user-links. Some or all of the digital images can be later converted to an analog signal that is sent by the set top box 402 to a television or other display device for display to a user.

The functionality implemented in the set top box 402 depicted in FIG. 5 can be implemented by one or more hardware modules, one or more software modules defining instructions performed by a processor, or a combination of both.

Network devices 406 may comprise a STB 402 having less functionality than the STB 402 depicted in FIG. 5. For example, one or more of the network devices 406 may comprise a "light" STB that can accept digital data from the baseline STB 402 and present that data for viewing by the user. Such a "light" STB may include the features shown in FIG. 5, without the need for one or more of the tuner/demodulator 504, FEC decoder 506. Further, the access card 512 and or video store 532 and associated functionality may be omitted.

Figure 6:
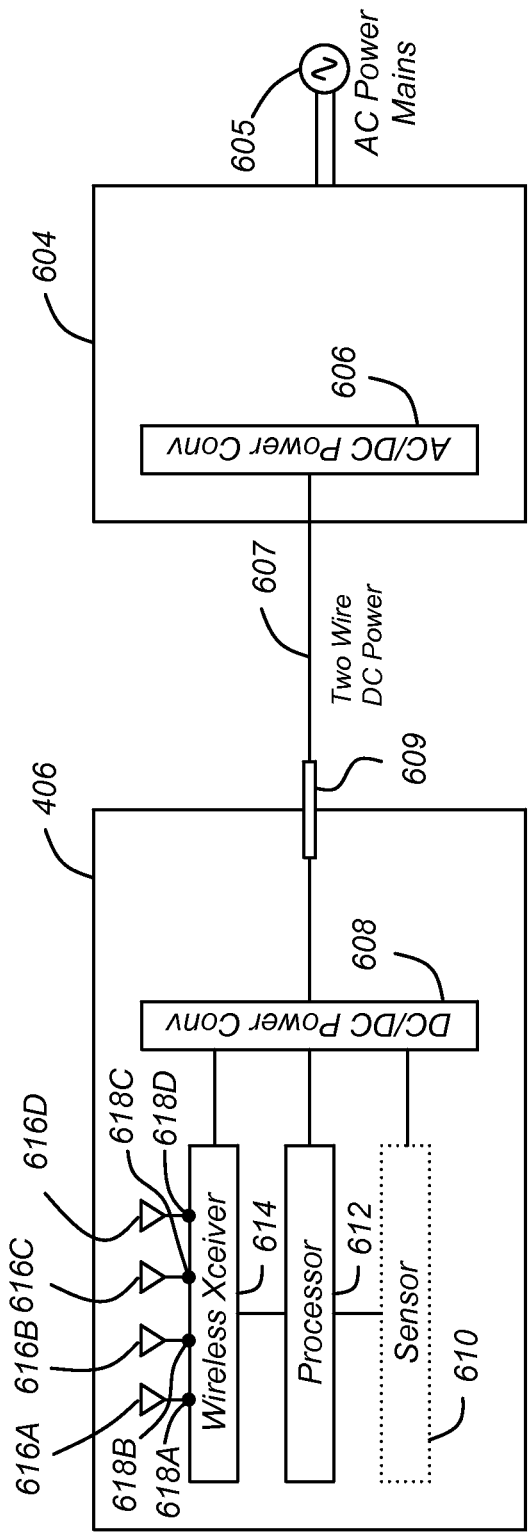
FIG. 6 is a diagram of a network device and its associated power supply.

FIG. 6 is a diagram of a generalized prior art secondary network device 406 and its associated power supply 604. The network device 406 comprises a processor 612 communicatively coupled a wireless transceiver 614. The processor 612 executes instructions that can be stored in a memory internal or external to the processor 612 to perform the required operations of the network device 406. For example, the instructions may command the processor 612 to communicate data with the STB 402 or other device in the network 400.

The wireless transceiver 614 is a module that wirelessly transmits and receives data from other elements of the network 400. In one embodiment, the wireless transceiver 614 is a multiple input, multiple output (MIMO) WiFi transceiver that is compliant with IEEE Std. 802.11ac and/or IEEE Std. 802.11n wireless networking standards specifications hereby incorporated by reference herein.

MIMO systems typically comprise multiple antennas (e.g. antennas 616A-616D) for both the transmission and reception, and offer increased data rates, range, and reliability over single input, single output (SISO) designs. This is implemented by multiple independent channels for sending multiple data streams that can be combined through dynamic digital beamforming and MIMO receiver processing enhanced by multi-user (MU-MIMO) advances. Such processing may be performed by a processor integrated with the wireless transceiver 614 or by processor 612.

In the illustrated embodiment, the wireless transceiver 614 comprises a plurality of input and/or output ports wireless transceiver ports 618A-681D that are communicatively coupled to one or more wireless transceiver antennas 616A-616D (hereinafter alternatively referred to as antennas 616). Each wireless transceiver port 618 provides an associated RF modulated output signal for transmission to other entities in the network 400, or even entities outside of the network 400, so long as those entities are capable of receiving and/or transceiving WiFi signals.

Typically, the number of independent channels and associated data streams that can be supported over a MIMO channel is equivalent to the number of antennas 616 communicatively coupled to the MIMO transceiver. Thus, a N×N MIMO transceiver typically supports the concurrent transmission or reception of a maximum of n data streams. For example, a 3×3 system can support concurrent transmission or reception of three data streams.

In the illustrated embodiment, the network device 406 is includes a sensor 610 such as a camera for recording optical images. The sensor 610 is communicatively coupled to the processor 612 so as to provide data to the processor 612 for further processing and/or transmission to other network devices 406 or STB 402. The sensor 610 may also be controlled by the processor 612. For example, instructions performed by the processor 612 may provide commands to control the sensor 610 (e.g. a camera's physical orientation, aperture, shutter speed and other factors). Processor 612 may also perform signal processing on the accepted signal for compression or security purposes. In one embodiment, the sensor 610 is a video camera (e.g. a camera capable of producing data or a signal representing a plurality of plurality of temporally closely spaced image frames, and may also be capable of producing a data or signal representing sound). Processor 612 may also be communicatively coupled to one or more data ports such as the illustrated RJ-45 (Ethernet) or RJ-11 (PSTN) connector.

In the illustrated embodiment, power is provided to the network device 406 by power supply 604. The power supply 604 obtains AC power (typically 120 or 240 Volts AC) from a power plug. The power plug may be any of the standard designs used world wide, including the standard plug compliant with National Electrical Manufacturers Association (NEMA) 5-15R. Typically, the power supply includes an AC/DC power converter 606 which converts the AC voltage available from the power plug a DC voltage for use by the network device 406. Power is provided from the power supply 604 to the network device 406 via power connector 607, which is typically a two-wire connector. The network device 406 typically comprises a DC power plug 609, which provides the DC power from the power connector 607 to the network device itself. The network device 406 may also optionally comprise a DC/DC power converter, which converts the DC power available on power connector 607 to a different voltage, if required. This permits the power supply 604 to be used with network devices 406 that require different DC power.

Hybrid Network Device—First Embodiment

Figure 7:
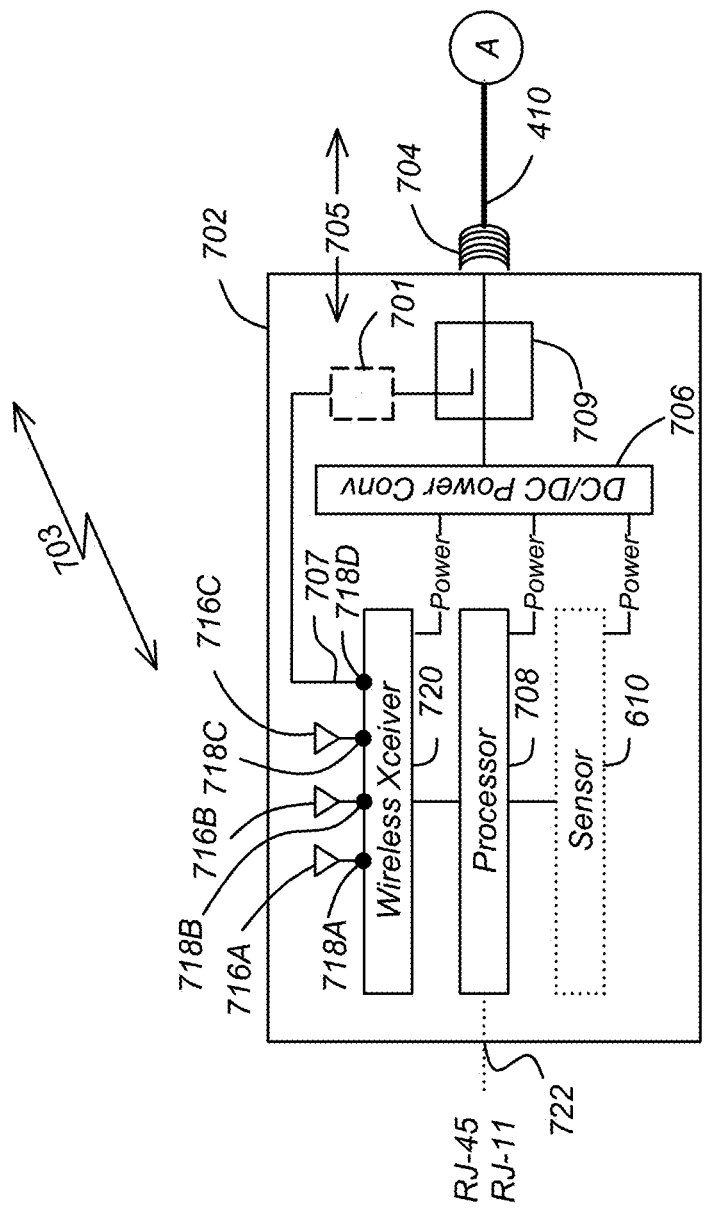
FIG. 7 is a diagram of an exemplary embodiment of a first hybrid network device that can be used as one of the network devices in the network.

FIG. 7 is a diagram of an exemplary embodiment of a first hybrid network device (HND) 702 that can be used as one of the network devices 402, 406. The first HND 702 comprises a first port 704 by which power is supplied to the first HND 702. In one embodiment, the port 704 is radio frequency (RF) compatible coaxial port that accepts a power signal to power the first HND 702 and also provides a means for communicating data and/or commands with other network devices 402, 606 as further described below. Power and data signals are provided to the port 704 via a coax cable network 410 communicatively coupled to the coaxial port 704 and to a source of power and/or recipient or source of data or commands.

Power provided to the first HND 702 via the port 704 may optionally be converted to another form of power (e.g. conversion from one DC voltage to another DC voltage) by power converter 706, thus allowing the first HND 702 to be used with network devices 402, 406 or power supplies providing different power signals to port 704 than required by the wireless transceiver 614, processor 708 and/or sensor 610 of the first HND 702. After such optional DC/DC power conversion, power is provided to processor 708, wireless transceiver 614, and an optional sensor 610.

The first HND 702 comprises processor 708 communicatively coupled to a wireless receiver 720. The first HND 702 may also optionally comprise a sensor 610.

The wireless transceiver 720 comprises a plurality of wireless transceiver ports 718A-718C, each communicatively coupled to an associated one of a plurality of antennas 716A-716C. Signals provided to the wireless transceiver ports 718A-718C are transmitted by antennas 716A-716C thereby providing at least a first communication path 703 for the transception of data and/or commands with other network devices.

In one embodiment, the wireless transceiver 720 is identical to the prior art wireless transceiver 614 illustrated in FIG. 6, which may be configured for RF transception from all ports 618A-618D in compliance with standard protocols such as IEEE 802.11. Unlike the standard network device 406 illustrated in FIG. 6, at least one of the wireless transceiver ports 718A-718D of the first HND 702 is communicatively coupled to port 704 via line 707 to form a second communication path 705 from the first HND 702 to other network devices. In the illustrated embodiment, this is accomplished via a coupler 709, and the RF modulated signal presented on that wireless receiver port 718D can be communicated within the network 400 to other network devices via the coaxial port 704 coupled to the coaxial cable network 410 of the transmission network 404. In one embodiment, coupler 709 communicatively couples the wireless transceiver port 718D to the RF compatible port 704 by inductive or capacitive coupling. Further, wireless transceiver port 718D may also be communicatively coupled to an antenna such as 616D, thus providing both wireless and wired transmission from the same port.

For example, in the embodiment illustrated in FIG. 7, a plurality of RF modulated output signals are provided to wireless receiver ports 718A-718D, each having at least a portion of the information to be transmitted by the hybrid network device 702. The portions of the information to be transmitted by the first HND 702 may differ (e.g. each portion has different data) or may overlap so that at least some of a first portion of the information comprises the same data as a second portion of the information, thus providing redundant transmission of the overlapping data. Wireless receiver ports 718A-718C are communicatively coupled to antennas 716A-716C, and therefore transmit the portion of the information that is presented at each port 718A-718C via the wireless network 414. Wireless transceiver port 718D is communicatively coupled to the RF compatible port 704 via the coupler, thus providing a communication path 705, to transmit the portion of the information presented at that receiver port 718 to other network devices 402, 406 via the coaxial cable network 410. Likewise, the first HND 702 may also transceive information with other network devices 402, 406 via the coaxial cable network 410, coupler 709 and wireless communication port 718D, as well as via the wireless network 414, via antennas 716A-716C and wireless transceiver ports 718A-718C.

Although FIG. 7 illustrates only one of the wireless transceiver ports 718 coupled to the coax communications system 410 via the coupler 709, a plurality of wireless transceiver ports 718 may be so coupled. Further, a port 718D may be coupled to both an antenna (e.g. 716D) and the coax communication system 410.

In one embodiment, the wireless transceiver 720 and the processor 708 of the first HND 702 has identical functionality as the wireless transceiver 614 and the processor 612 of the standard network device 406. In this case, data is transmitted via the second communication path 705 using port 718D is simply the same data that would have been wirelessly transmitted using an antenna coupled to port 718D, whether determined by the processor 708 or the wireless transceiver 720.

In another embodiment, the allocation of which information is transmitted via wireless transmission via first communication path 703 and which information is transmitted via port 704 via the second communication path 705 is determined differently than the standard network device 406. For example, data communicated on the second communication path 705 may be comprise data that is also transmitted on the first communication path 703 (e.g. by one of the wireless antennas 716). Such redundant transmission of data may be to assure transmission of high value data. Or, the second communication path 705 may be used to transmit information with different quality of service (QoS), bandwidth, or error requirements than the first communication path 703. Second communication path 705 may also be reserved for the transmission and reception of commands among network devices, leaving the first communication path 703 for transmission of only data. Or, second communication path 705 may be used to transmit sensitive data (as it is less easily intercepted by nearby wireless devices), leaving the first communication path 703 to transmit data of less sensitivity. For example, data used to authorize reception of media programs by network devices and the like may be transmitted via the second communication path 705. By virtue of it's inherently greater security the second communication path 705 may also be used to transmit secure data without encryption in some cases.

The foregoing determination of which data to transmit via the first communication path 703 and which data to transmit via the second communication path 705 can be made by the processor 708, the wireless transceiver 720, or both devices. For example, the processor 708 may tag data for transmission via the second communication path 705, with the wireless transceiver 720 responding to such tags to route the data to the appropriate port 718.

In one embodiment, the hardware elements and configuration of the wireless transceiver 720 and processor 708 of the first HND 702 are identical to the wireless transceiver 614 and processor 612 of the standard network device 406, with only changes to the software or firmware of the wireless transceiver 614 and/or processor 612 being altered or augmented to perform the task of determining what data is to be transmitted on which the first communication path 703 or the second communication path 705. Hence, the wireless transceiver 720 and processor 708 of the first HND 702 can be implemented by altering or adding to the instructions stored in memory of the wireless transceiver 614 and/or the processor 612 of the standard network device 406. Such instructions, when executed by the processor 708 and/or another processor in the wireless transceiver 720 either determine whether some given information is transmitted via the first communication path 703 and/or the second communication path 705, or respond to a command (e.g. from another network device) indicating commanding whether the data be transmitted by the first communication path 703 or the second communication path 705. This has the advantage in allowing the same chipset to be used for the standard device 406 and the first HND 702.

Whether the data allocation is accomplished as a standard network device 406 or a first HND 702, such allocation can be performed according to mesh networking topologies. Mesh networking is a topology in which each node cooperatively relays data so that data may be distributed in the network. Mesh networks may use flooding or routing techniques. Using flooding techniques, a node of a mesh network redundantly transmits data to multiple other nodes, either concurrently or serially, to assure that the data is received as desired. Using routing techniques, the information propagates along a path, moving from node to node, and this process continues until the ultimate destination for the information has been reached. Routing techniques account for broken communication paths and outages and can also account for traffic control, directing information to nodes that can best accept it and transmit the information to other nodes and finally to the destination. Mesh networks also typically include a self-healing capability, which allows other nodes in the network to perform the functions of a disabled node.

The first HND 702 may also comprise an optional data port 722 that is communicatively coupled to the processor 708. The optional data port 722 permits communication via other devices via another network such as the Ethernet network 416 depicted in FIG. 4. In one embodiment, the data port 722 comprises a RJ-45 connector for use in the Ethernet network 416. In another embodiment, the data port 722 comprises a RJ-11 connector coupled to a DSL line or the public switched telephone network (PSTN). For such embodiments, the first HND 702 may include the appropriate modem or the modem functionality may be implemented by the processor 708 executing appropriate instructions to perform such functionality.

The first HND 702 may also include a signal conditioning module 701. Signal conditioning module 701 performs any required signal conditioning to convert the signal from port 718D to a signal suitable for transmission via coaxial cable network 410 and converts signals obtained via coaxial cable network 410 to a signal suitable for presentation at port 718D. Such signal conditioning may include, for example, impedance matching (e.g. matching the impedance of port 718D with the impedance of the coaxial cable network 410), attenuation or amplification (e.g. attenuating the signal from port 718D to account for the fact that transmission via the coaxial cable network 410 is less lossy than that of wireless communication, level shifting, or frequency filtering or translation (e.g. to move the signal presented at port 718D to one or more different frequency bands or to remove energy in sub-bands). Signal conditioning module 701 may also perform more complex signal conditioning tasks such as a protocol conversion (for example, converting a data stream from one packet-based protocol to another packet-based protocol or another protocol, and vice-versa).

Hybrid Network Device—Second Embodiment

Figure 8:
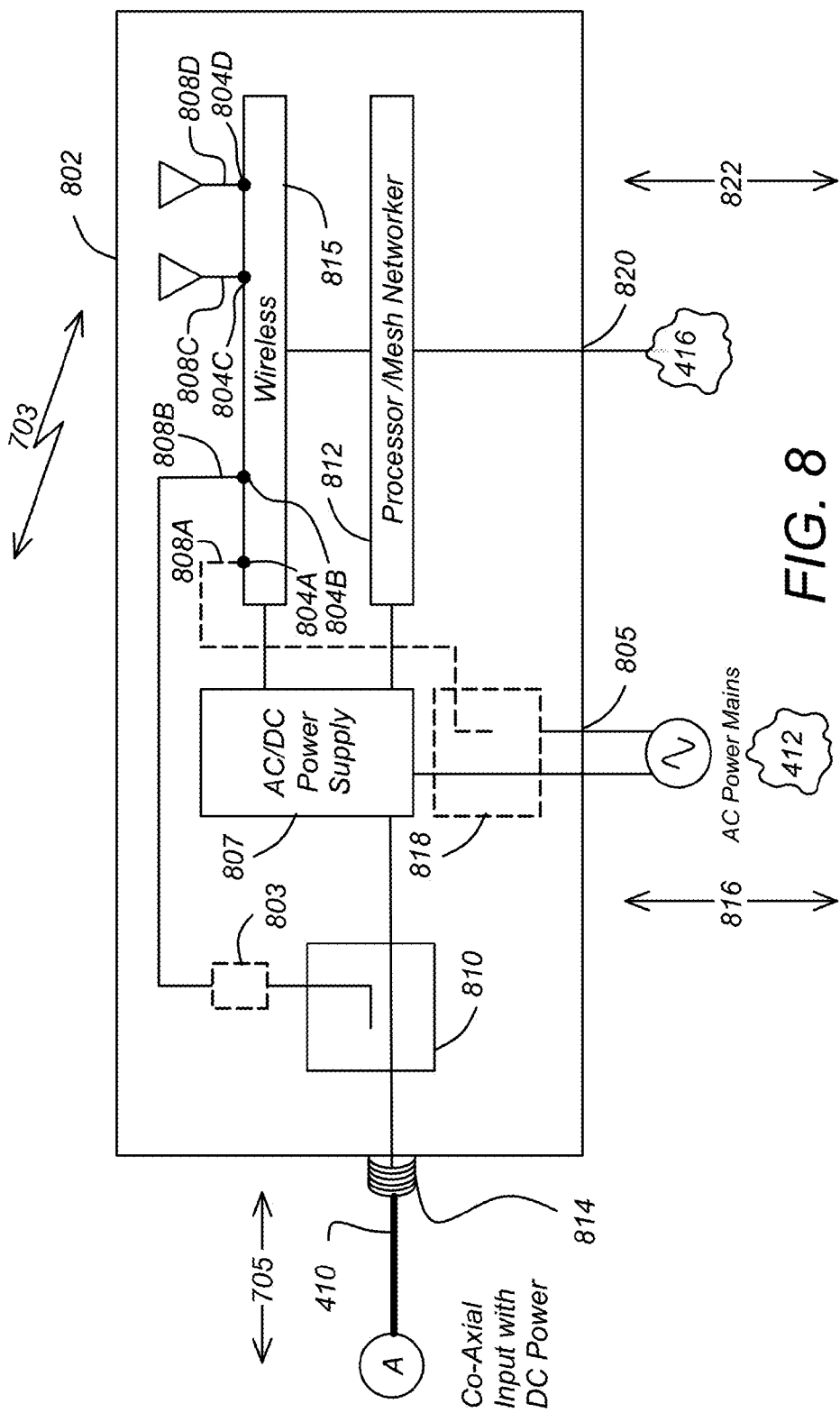
FIG. 8 is a diagram illustrating an exemplary embodiment of a second hybrid network device that can be used as one of the network devices.

FIG. 8 is a diagram illustrating exemplary embodiment of a second hybrid network device that can be used as one of the network devices 402, 406. The second HND 802 may be communicatively coupled to the first HND 702 via coaxial network 410 to provide power and exchange data.

Differences between the first HND 702 and the second HND 802 include (1) the second HND 802 obtains a power signal from an AC power source, and converts that power signal to a DC power signal that is provided to other HNDs on the coaxial network 410 and (2) the second HND 802 routes one of the ports from the wireless transceiver to a the AC power signal via a second coupler. This permits communication from the second HND 802 to other elements of the network 400 via the powerline network 412.

The second HND 802 comprises a first port 814 by which it supplies a power signal (and information carrying signal, as further described below) to the first HND 702 and other network devices on the coaxial network 410. In one embodiment, the port 814 a RF compatible coaxial port that provides a power signal to power the first HND 702 and also provides a means for communicating data and/or commands with other network devices 402, 406 via the coax network 410.

The second HND 802 comprises an AC power port 805, by which AC power is provided to the second HND 802. The AC power port 805 is communicatively coupled to the power supply 807. The power supply accepts the AC power signal from the AC power port 805, and converts the signal to a DC power signal for use by other communicatively coupled elements of the second HND 802, including the wireless receiver 815 and the processor 812. The power supply 807 is also coupled to the port 814 and can therefore provide power to other elements of the network 400 including the first HND 702 via the coaxial cable network 410. In the illustrated embodiment, the power supply 807 is coupled to port 814 via coupler 802, which is further discussed below.

The second HND 802 also comprises a wireless transceiver 815, and a processor 812 communicatively coupled to the wireless transceiver 815. Like the wireless transceiver 720 of the first HND 702, the wireless transceiver 815 of the second HND 802 comprises a plurality of transceiver ports 804C-804D, each coupled to an associated one of a plurality of antennas 806C-806D. Signals provided to the wireless transceiver ports 804C-804D are transmitted by antennas 806C-806D thereby providing a least a first communication path 703 for the transception of data and/or commands with other network devices.

As was true with the first HND 702, one or more of the wireless transceiver ports 804A-804D may be communicatively coupled to port 814 to form a second communication path 705 from the second HND 802 to other devices in the network 400. In the illustrated embodiment, this is accomplished by use of a coupler 810 that is communicatively coupled to a wireless receiver port 804B via line 808A and communicatively coupled between the power supply 807 and the port 814. The RF modulated signal presented on wireless receiver port 804B can be communicated within the network 400 to other network devices via line 808B and the coaxial port 814 coupled to the coaxial cable network 410 of the transmission network 404. Like the coupler 709 illustrated in the first HND 702, coupler 810 can operate by inductive or capacitive coupling.

The second HND 802 can also be used to implement a third communication path 816. This can be accomplished by routing one or more of the wireless transceiver ports (e.g. port 804A) to a second coupler 818 that is communicatively coupled between the power supply 807 and the AC power port 805. The RF modulated signal presented on wireless receiver port 804A is thereby provided to the AC power port 805 and can be communicated via the powerline network 412 to any network device having the appropriate connections and Powerline communication capability.

The second HND 802 may also comprise an optional data port 820 that is communicatively coupled to the processor 812. The optional data port 820 permits communication via other devices via another network such as the Ethernet network 416 depicted in FIG. 4. As was the case with the data port 722 of the first HND 702, the data port 820 of the second HND may comprise a RJ-45 connector for use in the Ethernet network 416, a RJ-11 connector coupled to a DSL line or the public switched telephone network (PSTN), or similar connector and network capability, and the second HND 802 may include the appropriate modem or the modem functionality may be implemented by the processor 812 executing appropriate instructions to perform such functionality.

Also like the wireless transceiver 720 and the processor 708 of the first HND 702, the wireless transceiver 815 and processor 812 of the second device may have identical functionality as the wireless transceiver 614 and the processor 612 of the standard network device 406. In this case, data is transmitted via the second communication path 705 using port 804B comprises the same data that would have been wirelessly transmitted using an antenna coupled to port 804B, whether determined by the processor 812 or the wireless transceiver 815. The allocation of which information is transmitted on which of the wireless ports 814A-804D can also be determined by the processor 812, a processor in the wireless transceiver 815, or by a combination of these elements, using instructions stored in a memory accessible by such processors. Since the second HND 802 can implement a third communication path 816 using the powerline network 412, the allocation may be made between the first 703, second 705, and third 816 communication paths. Allocation may also account for a fourth communication path, such as communication path 822 implemented via network 416. Finally, the wireless transceivers 720, 815 may be any networking chipset, including WiFi and MOCA (Multimedia Over Coax Alliance) compatible chipsets.

The second HND 802 may also include a signal conditioning module 803, which operations analogously to signal conditioning module 701 of the first HND 702.

Coaxial Cable Network Power Supply

Figure 9:
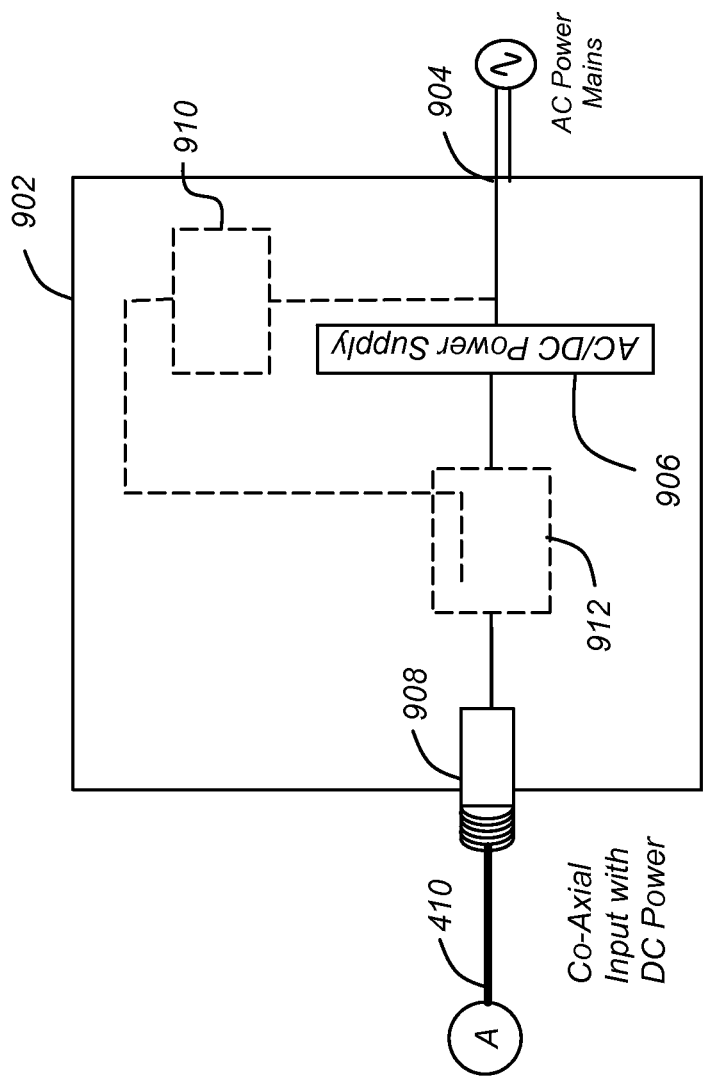
FIG. 9 is a diagram of an optional coaxial cable network power supply usable with hybrid network devices.

FIG. 9 is a diagram of an optional coaxial cable network power supply 902 for either the first HND 702 or (if the second HND is not coupled to an AC household power source) the second HND 802. The power supply 902 comprises an AC power port 904 that is communicatively coupled to a power source such as a household 110V or 220V line. A power supply 906 is communicatively coupled to the power port 904 to accept the power signal from the household line and convert that power signal to a power signal suitable for transmission over the coaxial cable network 410. In the illustrated embodiment, this the power supply 906 converts the 110V household power signal to a DC power signal of suitable voltage. The converted power signal is provided to a communicatively coupled coaxial power port 908 and thereby to the coaxial cable network 410. The coaxial cable network power supply 902 may also comprise an optional powerline converter 910 that can transceive data with the power port 904 and port 908 via coupler 912.

Operational Examples

Figure 10:
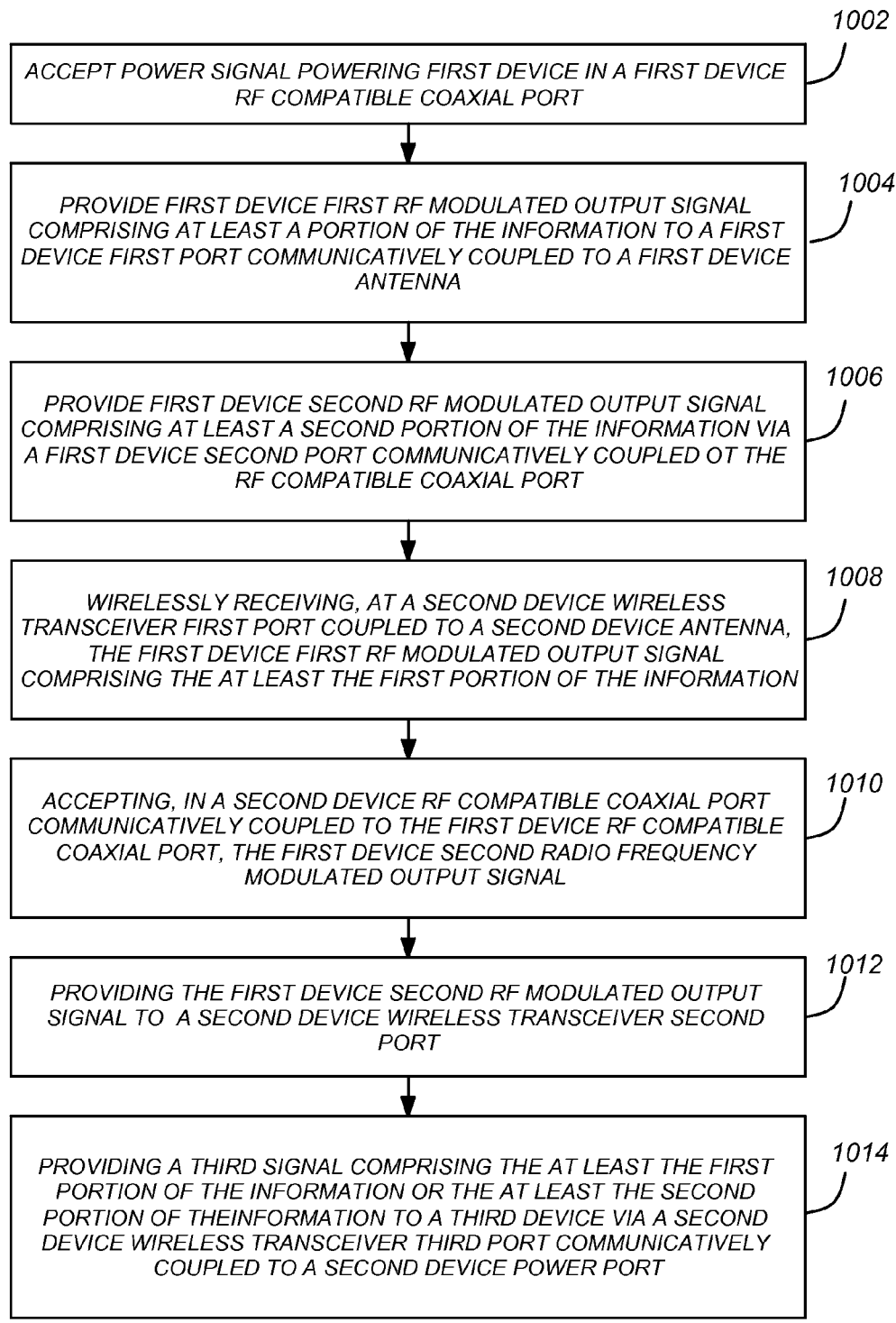
FIG. 10 is a diagram illustrating exemplary operations that can be used to perform hybrid wireless and wireline communications.

FIG. 10 is a diagram illustrating exemplary operations that can be used to perform hybrid wireless and wireline communications. In block 1002, a power signal powering a first device such as the first HND 702 is accepted in a first device RF compatible coaxial port such as port 704.

Block 1004 provides a first modulated output signal to a first port of the first device coupled to a first device antenna. The first modulated output signal comprises at least a portion of the information to be transmitted by the first device. For example, the first device can be embodied by the first HND 702, wherein a first modulated output signal is provided to wireless transceiver port 718C, which is communicatively coupled to antenna 716C. In one embodiment, the first modulated output signal is modulated at RF frequencies, and is a signal compliant with MIMO WiFi standards expressed in IEEE 802.11n, which are hereby incorporated by reference. The first modulated output signal may comprise data from the optional sensor 610, or other data, commands, or command responses from processor 708.

Referring now to block 1006, a first device second RF modulated output signal is provided to a first device second port communicatively coupled to the RF compatible coaxial port. The second modulated output signal comprises at least another portion of the information to be transmitted via the first device, and is transmitted with the same protocol as the first modulated output signal. In the example of the first HND 702, the second modulated output signal is provided to wireless transceiver port 718D, which is communicatively coupled to port 704 via coupler 709. Coupler 709 permits the first device second RF modulated output signal to be presented on port 704 and thereby transmitted by coaxial cable network 410 to other devices on the network 400.

Continuing to block 1008, the first device modulated signal is received at a second device wireless transceiver first port coupled to a second device antenna. For example, the second device can be embodied by the second HND 802, wherein the first modulated output signal is received in wireless transceiver port 804C coupled to antenna 806C. The at least a portion of the information in this signal can then be passed from the wireless transceiver 815 to other devices in the network 400 without further processing, or may be processed by processor 812 and used by the second HND 802 or further transmitted to another network device.

Block 1010 illustrates accepting the first device second RF frequency modulated signal in a second device RF compatible coaxial port communicatively coupled to the first device RF compatible coaxial port. Referring to the example presented in FIG. 8, this may be embodied by accepting the second modulated output signal transmitted by the first HND 702 via port 704 and coaxial cable network 410 at port 814 of the second HND 802. In block 1012, the first device second RF modulated output signal is provided from the second device RF compatible coaxial port 814 to a second device wireless transceiver second port. Referring to FIG. 8, this may be embodied by the conductive path 808B from coupler 810 to wireless transceiver port 804B. Coupler 810 of the second HND 802 allows the first device second RF frequency modulated signal from port 814 to be extracted and provided to port 804B. The portion of the information thus received from the first HND 702 can be used by the second HND 802, or can be transmitted to other network devices. This information may be sent to such devices without further processing by processor 812 (e.g. simply retransmitted by the wireless transceiver 815) or may undergo further processing by processor 812 before transmission.

As described above, using port 722, the first HND 702 can also transceive information via port 722 via wired network 416, thus transceiving information via a third communication path 816. Further, the second HND 802 can transceive information via port 805, via the powerline network 412, or the wired network 416, thus transmitting information via a third and/or fourth communication path.

With respect to the first HND 702, such information is provided to or received from port 722 by the processor 708. With respect to the second HND 802, the information may similarly be provided to other network devices via port 820 and the wired network 416, or may be provided to other network devices via the power port 805 and powerline network 412. This can be implemented by including a powerline coupler 818 between the power supply 807 and the power port 805, and routing one of the wireless transceiver ports (e.g. port 804A) to the powerline coupler 818. When so configured, modulated signals presented on port 804A may be transmitted via the powerline network 412. The powerline coupler 818 may include elements which demodulate the modulated signal obtained from wireless transceiver port 804A and remodulate it to a frequency and modulation scheme appropriate for transmission via the powerline network 412. Similarly, the coupler 818 may modulate data received by the second HND 802 via the powerline network 412 to a frequency and modulation scheme appropriate for reception at wireless transceiver port 804A.

Transception of information by such means is illustrated in block 1014, wherein a third signal comprising the at least the first portion of the information or the at least the second portion of the information is a provided to third device in the network 400 via a second device wireless transceiver third port communicatively coupled to a second device power port. Specifically, the first portion or the second portion of the information can be presented on wireless transceiver port 804 and transmitted to another device in the network via coupler 818, port 805 and powerline network 412.

For purposes of illustration the foregoing discussion presents an example of the first HND 702 transmitting information to the second HND 802 using hybrid transmission techniques. Analogous operations can be performed to transmit information from the second HND 802 to the first HND 702 or other network 400 devices. Furthermore, for purposes of simplicity of description, the foregoing operations have been described in the indicated order. However, the order of the foregoing operations need not be as indicated, and may in fact, be performed simultaneously or concurrently. For example, the operations of block 1006 may be performed before those of block 1004, and will typically be provided concurrently.

Exemplary Network

Figure 11:
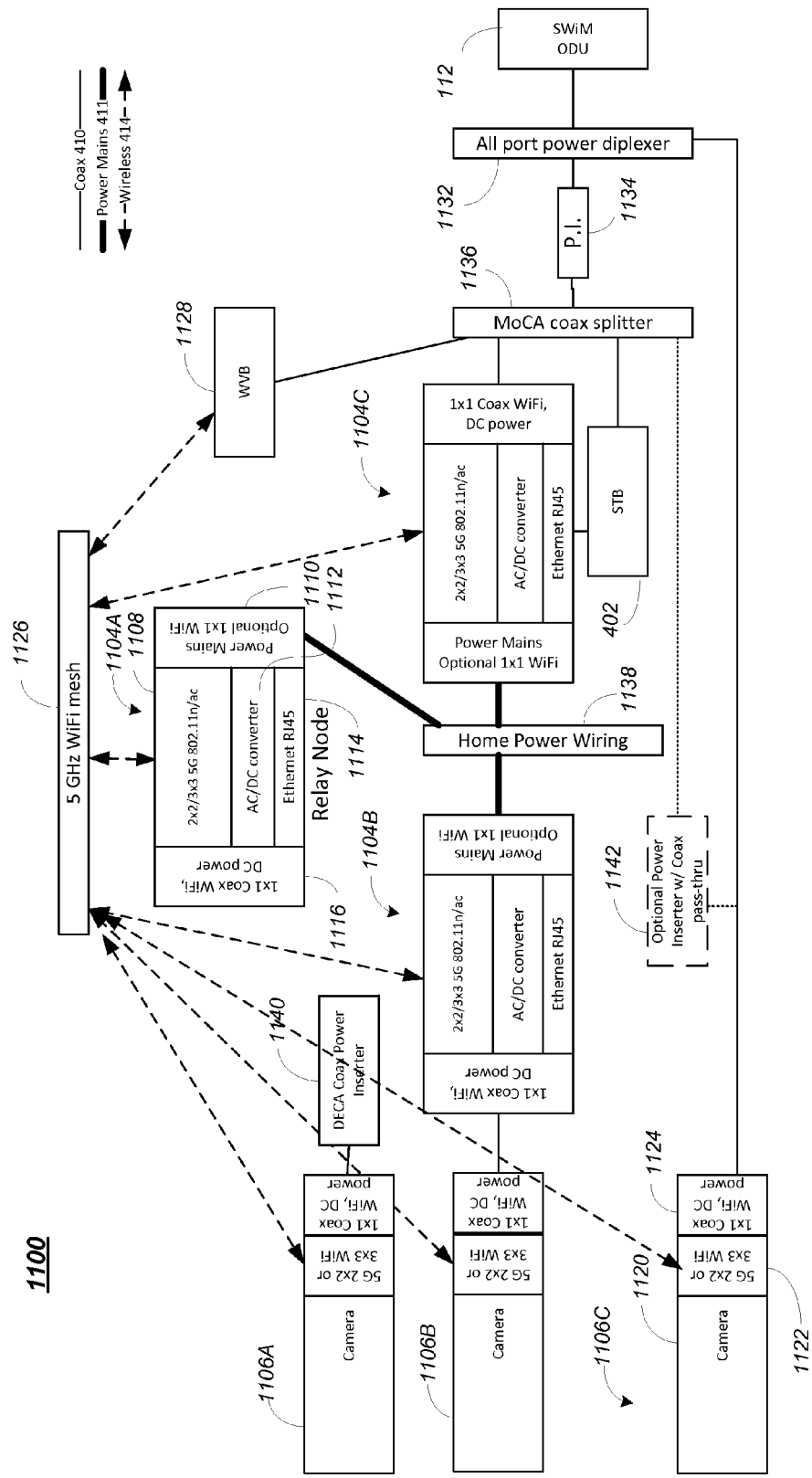
FIG. 11 is a diagram of an exemplary network having video surveillance capability.

FIG. 11 is a diagram of an exemplary network 1100 having video security camera capability integrated with a STB 402. By placing a 4×4 MIMO 802.11ac wireless radio in the camera which has four radio antenna interfaces, one of the antenna interfaces can be routed to an external coax "F" connector which is used both to communicate with other similarly equipped devices such as a wall-wart dongle or adapter with a connection to the wired or wireless home network. The remaining three antenna interfaces are used to provide a traditional 3×3 MIMO wireless interface simultaneously to and in addition to the 1×1 coax connection. By using a mesh networking stack in the camera, the network 1100 automatically determines if the more robust path is wired (1×1 coax) or wireless (3×3 MIMO), and send communication messages and data accordingly. This mitigates the risk of attempting to install the camera in an area with questionable wireless connectivity, making the installation in the home much more robust, without adding cost to the camera device.

Referring now to FIG. 11, the network 1100 comprises a plurality of network relay and power nodes 1104A-1104C (also sometimes referred to as wall wort(s) or relay node(s) 1104), and a plurality of sensor nodes 1106A-1106C (alternatively referred to hereinafter as sensor node(s) 1106).

Each relay node 1104 includes a wireless transceiver 1108, and AC/DC converter 1112, a coax DC power coupler 1116, and a powerline converter 1110. The relay nodes 1104 are embodiments of the second HND 802 described above, with the coax DC power coupler 1116 representing the port 814 and coupler 810 of the second HND 802, the WiFi transceiver 1108 representing the wireless transceiver 815 of the second HND 802, the AC/DC converter 1112 representing the power supply 807 of the second HND 802. Powerline converter 1110 is an embodiment of the powerline functionality provided by the second HND at port 805. Each relay node 1104 may also comprise a wall wart 1118), and an Ethernet transceiver 1114, which provides the communications provided on port 820 of the second HND 802.

Each sensor node 1106 comprises a sensor such as a camera 1102, a WiFi transceiver 1122, and a coax DC power coupler 124. The camera 1102 is an embodiment of the sensor 610 of the first HND 702, the WiFi transceiver 1122 is an embodiment of the wireless transceiver 720 of the first HND 702; and the coax DC power coupler 1124 is an embodiment of port 704, coupler 708, and associated structures of the first HND 702.

The network 1110 includes a WiFi mesh 1126. Although illustrated as a separate entity, the WiFi mesh 1126 is typically implemented in a distributed configuration, for example, by each of the processors in each of the WiFi transceivers (1108 and 1122) implementing a mesh networking protocol to relay data.

The network may also include a wireless video bridge (WVB) 1128. The WVB 1128 is a receiver that permits the signal from the headend to be provided to a television or display without requiring a physical cable to run to the STB 402. Typically, the WVB 1128 operates with a host STB 402 that includes a private and separate (non WiFi compliant) wireless network transceiver. A cable is used to couple the television or display with the WVB 1128. The WVB 1128 also receives user commands and wirelessly transmits those commands to the host STB 402.

Satellite signals received by the ODU 112 are provided to a power diplexer 1132, which provides the signals received by the ODU 112 to a coax splitter 1136 via power inserter (PI) 1134. In one embodiment, the coax splitter is compliant with Multimedia Over Coax Alliance (MoCA) standards. From the coax splitter 1136, the signal is provided to the WVB 1128 for distribution to other elements of the network 1100 via wireless transmission. The signal is also provided to a STB 402, which in the illustrated embodiment, includes or is communicatively coupled to relay node 1104C. Relay node 1104C can wirelessly provide the signal to any other element of the network 1100 that has a WiFi receiver, including any of the sensor nodes 1106 or other relay nodes 1104A-1104B. Relay node 1104A-1104C obtain power from the power wiring network of the home 1138, and can transmit information to the other relay nodes 1104 via powerline converters 1110.

Power can be provided to the sensor nodes 1106 by means including a coax power inserter 1140, by one of the relay nodes 1104 (e.g. relay node 1104B), or by use of a power inserter with a coaxial signal pass-through 1142, in each case, by connection via the coax network 410 and port 704.

Data and or commands can be provided by between the sensor nodes 1106 and the STB 402 via any combination of the wireless network 414, the coax cable network 410 or powerline network 411. For example, sensor node 1106A may transmit information to or receive information from the STB 402 via wireless network 414 using the WiFi Mesh 1126 and relay node 1104C. Sensor node 1106B may transmit information to or receive information from the STB 402 in the same way (using only the wireless network 414, or may transmit some or all of the same information to or received data from the STB via coaxial cable network 410 to relay node 1104B and thence to relay node 1104C (which may be accomplished via wireless network 414 or powerline network 411 using the home power wiring 1138. Finally, sensor node 1106C may communicate with the STB 402 via the wireless network 414 via relay node 1104C, or via the coax network 410 using the coax pass through 1142 and the coax splitter 1136.

Hardware Environment

Figure 12:
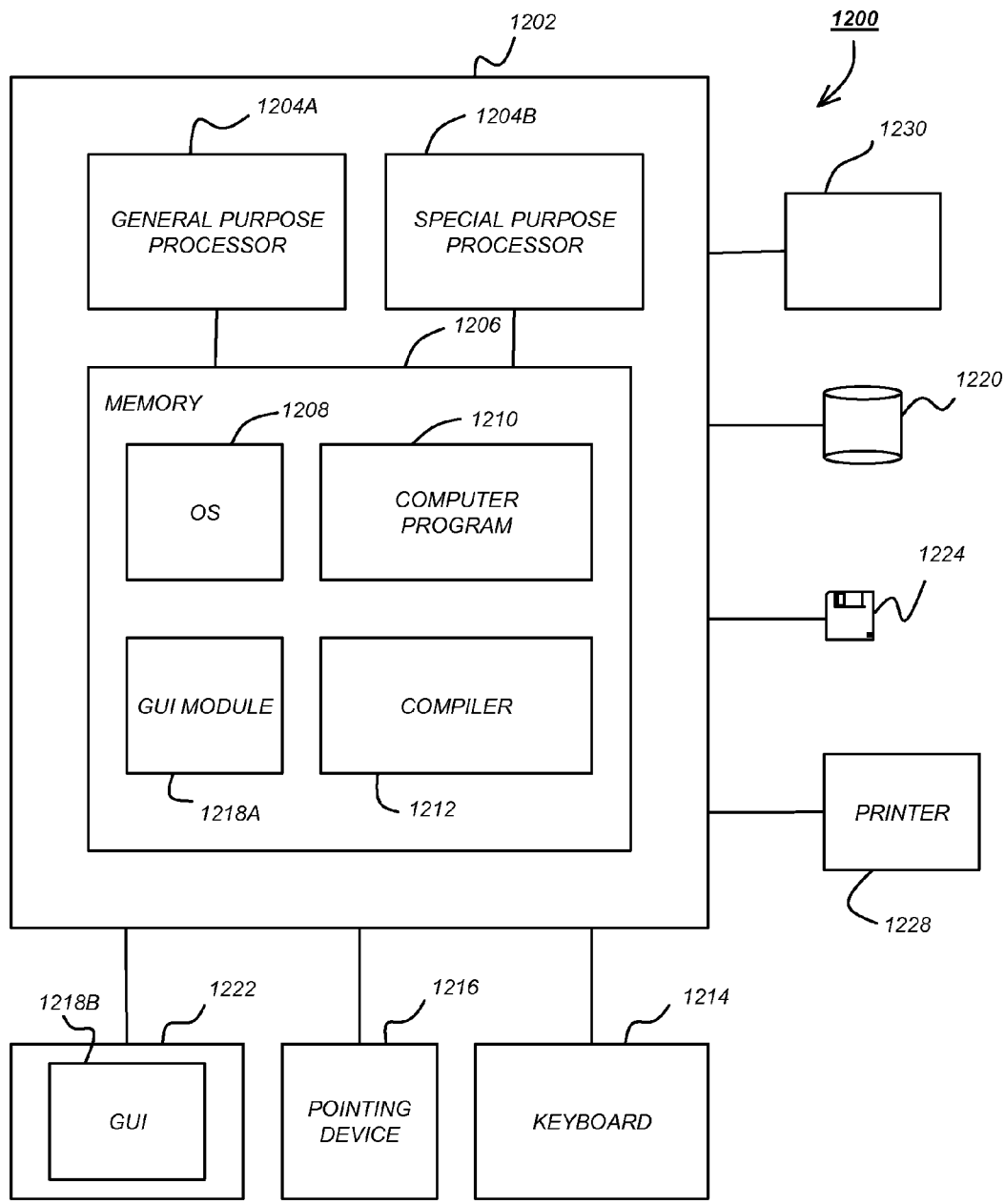
FIG. 12 is a diagram illustrating an exemplary computer system that can be used to implement elements of the present invention, including network devices.

FIG. 12 is a diagram illustrating an exemplary computer system 1200 that could be used to implement elements of the present invention, including the network devices 402, 406. The computer system comprises 1200 a computer 1202 that may include a general purpose hardware processor 1204A and/or a special purpose hardware processor 1204B (hereinafter alternatively collectively referred to as processor 1204) and a memory 1206, such as random access memory (RAM). The computer 1202 may be coupled to other devices, including input/output (I/O) devices such as a keyboard 1214, a mouse device 1216 and a printer 1228.

In one embodiment, the computer 1202 operates by the general purpose processor 1204A performing instructions defined by the computer program 1210 under control of an operating system 1208. The computer program 1210 and/or the operating system 1208 may be stored in the memory 1206 and may interface with the user and/or other devices to accept input and commands and, based on such input and commands and the instructions defined by the computer program 1210 and operating system 1208 to provide output and results.

Output/results may be presented on the display 1222 or provided to another device for presentation or further processing or action. In one embodiment, the display 1222 comprises a liquid crystal display (LCD) having a plurality of separately addressable pixels formed by liquid crystals. Each pixel of the display 1222 changes to an opaque or translucent state to form a part of the image on the display in response to the data or information generated by the processor 1204 from the application of the instructions of the computer program 1210 and/or operating system 1208 to the input and commands. Other display 1222 types also include picture elements that change state in order to create the image presented on the display 1222. The image may be provided through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors.

Some or all of the operations performed by the computer 1202 according to the computer program 1210 instructions may be implemented in a special purpose processor 1204B. In this embodiment, some or all of the computer program 1210 instructions may be implemented via firmware instructions stored in a read only memory (ROM), a programmable read only memory (PROM) or flash memory within the special purpose processor 1204B or in memory 1206. The special purpose processor 1204B may also be hardwired through circuit design to perform some or all of the operations to implement the present invention. Further, the special purpose processor 1204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1202 may also implement a compiler 1212 which allows an application program 1210 written in a programming language such as COBOL, C++, FORTRAN, or other language to be translated into processor 1204 readable code. After completion, the application or computer program 1210 accesses and manipulates data accepted from I/O devices and stored in the memory 1206 of the computer 1202 using the relationships and logic that was generated using the compiler 1212.

The computer 1202 also optionally comprises an external communication device such as a modem, satellite link, Ethernet card, or other device for accepting input from and providing output to other computers.

In one embodiment, instructions implementing the operating system 1208, the computer program 1210, and/or the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, or a flash drive. Further, the operating system 1208 and the computer program 1210 are comprised of computer program instructions which, when accessed, read and executed by the computer 1202, causes the computer 1202 to perform the steps necessary to implement and/or use the present invention or to load the program of instructions into a memory, thus creating a special purpose data structure causing the computer to operate as a specially programmed computer executing the method steps described herein. Computer program 1210 and/or operating instructions may also be tangibly embodied in memory 1206 and/or data communications devices 1230, thereby making a computer program product or article of manufacture according to the invention. As such, the terms "article of manufacture", "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1202.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device for communicating information using a plurality of communication paths, comprising:
   a first device RF compatible coaxial port, for accepting a power signal powering the first device from a second device;
   a first device wireless transceiver, powered by the power signal, the first device wireless transceiver comprising:
      a first device first port providing a first device first radio-frequency modulated output signal comprising at least a first portion of the information, the first device first port communicatively coupled to a first device antenna to wirelessly transmit the at least a first portion of the information via a first of the plurality of communication paths;
      a first device second port providing a first device second radio frequency modulated output signal comprising at least a second portion of the information, the first device second port communicatively coupled to the RF compatible coaxial port to transmit the at least a second portion of the information via a second of the plurality of communication paths concurrently with the transmission of the at least the first portion of the information via the first of the plurality of communication paths.

2. The device of claim 1, wherein the first device second radio frequency modulated output uses same protocol and frequency as the first device first radio frequency modulated output.

3. The device of claim 2, wherein the second port is communicatively coupled to the RF compatible coax port via an attenuating coupler.

4. The device of claim 1, wherein the first device first radio-frequency modulated output signal is at a first signal intensity and the first device second radio-frequency modulated output signal is at a second signal intensity less than the first signal intensity.

5. The device of claim 1, wherein the first portion of the information is the same as the second portion of the information.

6. The device of claim 1, further comprising a processor, executing at least a portion of mesh networking instructions for allocating the information between the first portion of information and the second portion of the information.

7. The device of claim 1, wherein the second device comprises:
a second device RF compatible coaxial port, communicatively coupled to the first device RF compatible coaxial port at least in part via a coaxial cable;
a second device wireless transceiver, the second device wireless transceiver comprising:
a second device first port for receiving the first device first radio-frequency modulated output signal comprising the at least the first portion of the information, the second device first port coupled to a second device antenna to wirelessly receive the at least the first portion of the information via the first of the plurality of communication paths;
a second device second port for accepting the first device second radio frequency modulated output signal comprising the at least the second portion of the information, the second device second port communicatively coupled to the second device RF compatible port to receive the at least the second portion of the information via the second of the plurality of communication paths.

8. The device of claim 7, wherein the second device second port is communicatively coupled to the second device RF compatible coaxial port via a second coupler.

9. The device of claim 7, wherein the second device further comprises a processor, executing at least another portion of mesh networking instructions for allocating the information between the first portion of information and the second portion of information.

10. The device of claim 7, wherein the second device RF compatible coaxial port provides the power signal powering the first device.

11. The device of claim 7, wherein the power signal is generated from a power source provided on a second device power port.

12. The device of claim 7, wherein the second device wireless transceiver further comprises a second device third port for providing a third signal comprising the first portion of the information or the second portion of the information to a third device, the second device third port communicatively coupled to a second device power port to transmit the first portion of the information or the second portion of the information via a third of the plurality of communication paths.

13. The device of claim 12, wherein at least a portion of the third of the plurality of communication paths is a non-wireless communication path.

14. A method for communicating information using a plurality of communication paths, comprising:
accepting a power signal powering a first device in a first device RF compatible coaxial port;
providing a first device first radio-frequency modulated output signal comprising at least a first portion of the information to a first device first port communicatively coupled to a first device antenna to wirelessly transmit the at least a first portion of the information via a first of the plurality of communication paths;
providing a first device second radio frequency modulated output signal comprising at least a second portion of the information via a first device second port communicatively coupled to the RF compatible coaxial port to transmit, concurrently with the transmission of the at least a first portion of the information, the at least a second portion of the information via a second of the plurality of communication paths.

15. The method of claim 14, wherein the first device second radio frequency modulated output uses same protocol and frequency as the first device first radio frequency modulated output.

16. The method of claim 15, further comprising:
attenuating the first device second radio frequency modulated output signal before transmitting the at least a second portion of the information via the second of the plurality of communication paths.

17. The method of claim 14, further comprising:
wirelessly receiving, at a second device wireless transceiver first port coupled to a second device antenna, the first device first radio frequency modulated output signal comprising the at least the first portion of the information;
accepting, in a second device RF compatible coaxial port communicatively coupled to the first device RF compatible coaxial port at least in part via a coaxial cable, the first device second radio frequency modulated output signal comprising the at least the second portion of the information;
providing the first device second radio frequency modulated output signal comprising the at least the second portion of the information to a second device wireless transceiver second port.

18. The method of claim 17, further comprising:
providing a third signal comprising the at least the first portion of the information or the at least the second portion of the information to a third device via a second device wireless transceiver third port communicatively coupled to a second device power port.

19. A method for communicating information from a first device using a plurality of communication paths, comprising:
wirelessly transmitting a first device first radio-frequency modulated output signal comprising at least a first portion of the information via a first device wireless transceiver first port of the first device, the first device wireless transceiver powered by a power signal received at a first device RF compatible coaxial port; and
non-wirelessly transmitting, concurrently with the wireless transmission of the first device first radio-frequency modulated signal, a first device second radio-frequency modulated output signal comprising at least a second portion of the information via a first device wireless transceiver second port of the first device, the first device wireless transceiver second port of the first device communicatively coupled to the first device RF compatible coaxial port.

20. The method of claim 19, wherein the first device second radio frequency modulated output uses same protocol and frequency as the first device first radio frequency modulated output.

21. The method of claim 20, further comprising:
wirelessly receiving, at a second device wireless transceiver first port, the first device first radio-frequency modulated output signal comprising the at least the first portion of the information;
non-wirelessly receiving, at a second device wireless transceiver second port, the first device second radio-frequency modulated output signal comprising the at least the second portion of the information;

wherein the power signal is provided to the first device RF compatible coaxial power of the first device via a second device RF compatible coaxial port.

22. The method of claim 21, further comprising:

providing a third signal comprising the at least the first portion of the information or at the at least the second portion of the information to a third device via a second device wireless transceiver third port communicatively coupled to a second device power port.

* * * * *